US009264721B2

(12) United States Patent
Kim et al.

(10) Patent No.: US 9,264,721 B2
(45) Date of Patent: Feb. 16, 2016

(54) VIDEO ENCODING/DECODING APPARATUS, DE-BLOCKING FILTER AND FILTERING METHOD BASED ON INTRA-PREDICTION DIRECTIONS FOR SAME, AND RECORDING MEDIA

(75) Inventors: Hayoon Kim, Seongnam-si (KR); Yoonsik Choe, Goyang-si (KR); Yonggoo Kim, Seoul (KR); Yungho Choi, Anyang-si (KR); Jinwoo Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 500 days.

(21) Appl. No.: 13/125,946

(22) PCT Filed: Oct. 16, 2009

(86) PCT No.: PCT/KR2009/005965
§ 371 (c)(1),
(2), (4) Date: Apr. 25, 2011

(87) PCT Pub. No.: WO2010/047499
PCT Pub. Date: Apr. 29, 2010

(65) Prior Publication Data
US 2011/0200103 A1   Aug. 18, 2011

(30) Foreign Application Priority Data
Oct. 23, 2008   (KR) .................. 10-2008-0104021

(51) Int. Cl.
*H04N 7/12*       (2006.01)
*H04N 11/02*      (2006.01)
(Continued)

(52) U.S. Cl.
CPC ........... *H04N 19/117* (2014.11); *H04N 19/159* (2014.11); *H04N 19/176* (2014.11); *H04N 19/61* (2014.11); *H04N 19/86* (2014.11)

(58) Field of Classification Search
CPC .................... H04N 19/0089; H04N 19/00909; H04N 19/00066; G06T 5/002
USPC ..................... 375/240.01–240.27, 240.29
See application file for complete search history.

(56) References Cited

U.S. PATENT DOCUMENTS

| 2005/0201633 | A1* | 9/2005 | Moon et al. ................... 382/268 |
| 2006/0002476 | A1  | 1/2006 | Park et al. |
| 2006/0067403 | A1* | 3/2006 | Sakai ........................ 375/240.12 |
| 2007/0025448 | A1* | 2/2007 | Cha et al. ................. 375/240.24 |

(Continued)

FOREIGN PATENT DOCUMENTS

| KR | 10-2005-0102805 | 10/2005 |
| KR | 10-2007-0077955 | 7/2007 |

OTHER PUBLICATIONS

International Search Report mailed Jun. 1, 2010 for PCT/KR2009/005965.

*Primary Examiner* — Andy Rao
*Assistant Examiner* — Jared Walker
(74) *Attorney, Agent, or Firm* — Hauptman Ham, LLP

(57) ABSTRACT

A video encoding/decoding apparatus, a deblocking filter and filtering method based on intra-prediction directions for same, and recording media are disclosed, and the deblocking filter includes: a boundary strength determiner for determining strength of boundary of current block; an intra-block identifier for confirming intra-block identity of a subblock enclosing first pixel at a certain location with reference to the boundary; an intra-prediction direction identifier for identifying an intra-prediction direction of the subblock if the subblock is identified as an intra-block; a filtering pixel selection unit for selecting pixels for filtering based on the first pixel and the identified intra-prediction direction; and a filtering unit for filtering in horizontal direction, vertical direction, or diagonal direction depending on the intra-prediction direction and relationships between pixel values of the selected pixels to eliminate deblocking artifacts within diagonal edges at a boundary between blocks by deblocking filtering in the intra-prediction direction.

23 Claims, 11 Drawing Sheets

VERTICAL BLOCK BOUNDARY

(51) Int. Cl.
*H04N 11/04* (2006.01)
*H04N 19/117* (2014.01)
*H04N 19/159* (2014.01)
*H04N 19/176* (2014.01)
*H04N 19/61* (2014.01)
*H04N 19/86* (2014.01)

(56) References Cited

U.S. PATENT DOCUMENTS

2008/0107177 A1* 5/2008 Han et al. ................. 375/240.15
2009/0110069 A1* 4/2009 Jung et al. ................. 375/240.12
2010/0135389 A1* 6/2010 Tanizawa et al. ........ 375/240.12

* cited by examiner

VERTICAL BLOCK BOUNDARY

HORIZONTAL BLOCK BOUNDARY

IN CASE OF VERTICAL BLOCK
BOUNDARY

IN CASE OF HORIZONTAL BLOCK
BOUNDARY

VIDEO ENCODING/DECODING APPARATUS, DE-BLOCKING FILTER AND FILTERING METHOD BASED ON INTRA-PREDICTION DIRECTIONS FOR SAME, AND RECORDING MEDIA

CROSS REFERENCE TO RELATED APPLICATION

This application claims the priority of Korean Patent Application No. 10-2008-0104021, filed on Oct. 23, 2008, in the KIPO (Korean Intellectual Property Office), the disclosure of which is incorporated herein in their entirety by reference. Further, this application is the National Phase application of International Application No. PCT/KR2009/005965, filed Oct. 16, 2009, which designates the United States and was published in Korean. Each of these applications is hereby incorporated by reference in their entirety into the present application.

TECHNICAL FIELD

The present disclosure relates to an image improvement technology in video encoding/decoding. More particularly, the present disclosure relates to a video encoding/decoding apparatus for removing a blocking effect in the encoding/decoding operations, a deblocking filter and filtering method based on intra-prediction directions for same and recording media.

BACKGROUND ART

The descriptions in this section merely provide background information related to the present disclosure and may not constitute prior art.

Generally, in video codecs such as MPEG and H.264, video compression is performed in the basic unit of macroblock which has 16 pixels horizontally by 16 pixels vertically. Such macroblocks are respectively subject to an intra or inter prediction for compensating a current macroblock by using information on adjacent pixels neighboring the current macroblock or a previous frame of the current macroblock, and then compressed through a transform of the difference between the image of the current macroblock and the image after the compensation with a subsequent quantization and an entropy encoding. In this process, since there are occasions of image loss during the quantization and the step of referencing the previous image or blocks neighboring the current image may have different images referenced by the respective blocks, a phenomenon of blocking artifact shows boundaries of blocks at each of the units of transform or motion compensation. As the intensity of the quantization gets stronger, such phenomenon becomes more prominent to significantly degrade the video quality.

Therefore, a block encoding needs to reduce the blocking artifact due to the motion compensation and transform by using a means called deblocking filter for smoothing the boundaries between blocks.

The deblocking filter used for H.264 video codec performs the filtering by deciding whether to filter at every boundary of the 4×4 block that is the minimum processing unit. That is, the filtering is not applied to an edge decided but the filtering is carried out upon identifying the blocking artifact not the edge. According to a method of filtering with respective to a macroblock, the deblocking filter is first taken horizontally across the vertical block boundaries as shown in FIG. 1, and then taken vertically across the horizontal block boundaries as shown in FIG. 2.

As illustrated, existing deblocking filters conduct filtering in vertical and horizontal directions only but refrain from the filtering when a block boundary is determined as an edge of the actual image. However, for a diagonal edge other than an edge in the vertical or horizontal direction, there is a problem that a blocking artifact within the diagonal edge at the block boundary cannot be removed.

DISCLOSURE

Technical Problem

Therefore, the present disclosure has been made for removing the blocking artifact occurring at an oblique edge such as a diagonal edge as well as the blocking artifacts occurring at edges in vertical and horizontal directions through providing a video encoding/decoding apparatus for removing a blocking effect in the encoding/decoding operations, a deblocking filter and filtering method based on intra-prediction directions for same and recording media.

Technical Solution

One aspect of the present disclosure provides a deblocking filter based on intra-prediction directions, the deblocking filter including: a boundary strength determiner for determining a strength of a boundary of a current block; an intra-block identifier for confirming an intra-block identity of a subblock enclosing a first pixel at a certain location determined with reference to the boundary; an intra-prediction direction identifier for performing an identification of an intra-prediction direction of the subblock if the subblock is identified as an intra-block; a filtering pixel selection unit for performing a selection of pixels for filtering based on the first pixel and the intra-prediction direction after the identification; and a filtering unit for performing the filtering in horizontal direction, vertical direction, or diagonal direction depending on the intra-prediction direction and relationships between pixel values the pixels upon the selection.

The filtering unit, in the case where the intra prediction direction is identified as being diagonal and if a relationship between the pixel values of the selected pixels satisfies a first condition having been predetermined, carries out the filtering in the diagonal direction. The first condition having been predetermined is $BS>0$ && $|dp0-q0|<\alpha$ && $|dp1-dp0|<k\beta$ && $|dq1-q0|<k\beta$ where $\alpha$ and $\beta$ are quantization parameter functions; $q0$ and $dq1$, with the boundary being a vertical (or horizontal) boundary, are respectively a first pixel and a second pixel on the right hand side (or lower side) of the vertical (or horizontal) boundary in the diagonal direction; $dp0$ and $dp1$, with the boundary being a vertical (or horizontal) boundary, are respectively the first and second pixels on the left hand side (or upper side) of the vertical (or horizontal) boundary in the diagonal direction; k is a constant; and $q0$ represents the first pixel. The filtering unit performs the filtering in the horizontal or vertical direction if the relationship between the pixel values of the selected pixels does not satisfy the first condition.

The filtering unit, in the case where the intra prediction direction is identified as being nondiagonal and if a relationship between the pixel values of the pixels for filtering upon the selection satisfies a second condition having been predetermined, carries out the filtering in the horizontal or vertical direction. The second condition having been predetermined is BS>0 && |p0−q0|<α && |p1−p0|<β && |q1−q0|<β where α and β are quantization parameter functions; q0 and q1, with the boundary being vertical (or horizontal) boundary, are respectively a first pixel and a second pixel on the right hand side (or lower side) of the vertical (or horizontal) boundary in the horizontal (or vertical) direction; p0 and p1 are respectively a first pixel and a second pixel on the left hand side (or upper side) of the vertical (or horizontal) boundary; and q0 represents the first pixel. The filtering unit does not perform the filtering if the second condition is not satisfied.

Another aspect of the present disclosure provides a deblocking filtering method based on intra-prediction directions, the deblocking filtering method including: determining a strength of a boundary of a current block; confirming an intra-block identity of a subblock enclosing a first pixel at a certain location determined with reference to the boundary; performing an identification of an intra-prediction direction of the subblock if the subblock is identified as an intra-block; performing a selection of pixels for filtering based on the first pixel and the intra-prediction direction after the identification; and filtering in horizontal direction, vertical direction, or diagonal direction depending on the intra-prediction direction and relationships between pixel values of the pixels upon the selection.

Yet another embodiment of the present disclosure provides a video encoding apparatus including: a predictor for predicting a current block of an image to generate a predicted block; a subtractor for subtracting the predicted block from the current block to generate a residual block; a transformer for performing a transform on the residual block into a frequency domain; a quantizer for performing a quantization on the residual block after the transform; an encoder for encoding the residual block after the quantization; an inverse quantizer for performing an inverse quantization on the residual block; an inverse transformer for performing an inverse transform on the residual block after the inverse quantization into a residual block having pixel signals on time axis; an adder for adding the predicted block to the residual block after the inverse transform to perform a reconstruction of the current block; and a deblocking filtering unit for deblocking-filtering the current block after the reconstruction by selecting pixels for filtering based on intra prediction directions of subblocks of the current block having been reconstructed and performing the filtering in horizontal direction, vertical direction, or diagonal direction depending on the intra prediction directions and relationships between pixel values of the pixels upon the selection.

Yet another embodiment of the present disclosure provides a video decoding apparatus including: a decoder for decoding a bitstream to extract a residual block; an inverse quantizer for performing an inverse quantization on the residual block; an inverse transformer for performing an inverse transform on the residual block after the inverse quantization; a predictor for predicting a current block to generate a predicted block; an adder for adding the predicted block to the residual block after the inverse transform to perform a reconstruction of the current block; and a deblocking filtering unit for deblocking-filtering the current block reconstructed by the adder so as to reduce errors possibly generated during a quantization by selecting pixels for filtering based on intra prediction directions of subblocks of the current block and performing the filtering in horizontal direction, vertical direction, or diagonal direction depending on the intra prediction directions and relationships between pixel values of the pixels upon the selection.

Yet another embodiment of the present disclosure provides a computer readable medium storing a computer program including functions of: determining a strength of a boundary of a current block; confirming an intra-block identity of a subblock enclosing a first pixel at a certain location determined with reference to the boundary; performing an identification of an intra-prediction direction of the subblock if the subblock is identified as an intra-block; performing a selection of pixels to be filtered based on the first pixel and the intra-prediction direction after the identification; and filtering in horizontal direction, vertical direction, or diagonal direction depending on the intra-prediction direction and relationships between pixel values of the pixels upon the selection.

Advantageous Effects

According to the disclosure as described above, it is possible to remove not just the blocking artifacts at edges extending in vertical and horizontal directions but also the blocking artifacts possibly occurring within a diagonal edge at the boundary between blocks through a deblocking filtering in the intra-prediction directions.

MODE FOR INVENTION

Figure 1:
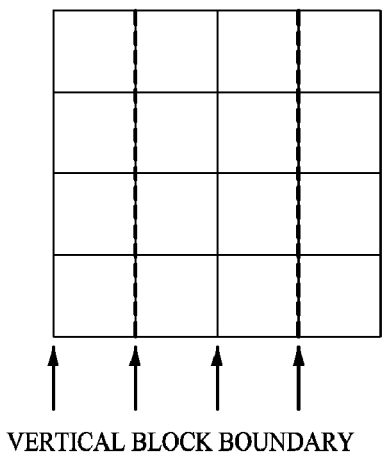
FIGS. 1 and 2 are diagrams respectively showing vertical and horizontal boundaries of macroblocks.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear. Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Since a video on a screen is composed of as much as thirty frames per second causing a short inter-frame interval, human eyes cannot distinguish between the frames. For this reason, casting the thirty frames within a second will make the observing eyes believe the frames are a continuous movement.

If there is such a similarity between a previous frame and a current frame, it is possible to make a prediction of a pixel value of one frame from a known value of a pixel constituting a preceding frame (This kind of prediction is called an inter prediction carried out between frames).

Such video data encoding and decoding are performed based on the technology of motion prediction. Motion prediction is carried out in a way of referencing to a past frame on a temporal axis or to both of the past frame and a future frame. The reference frame is a frame that is used as a reference for encoding or decoding a current frame. Additionally, in the block-based video coding, a still image (frame) forming the video is divided into macroblocks and subblocks which constitute the macroblock so that the image is motion-predicted and encoded in units of a block.

Prediction of a next pixel is also possible within a same frame by taking advantage of the correlations among pixel signals (This kind of prediction is called an intra prediction carried out inside a frame).

Figure 3:
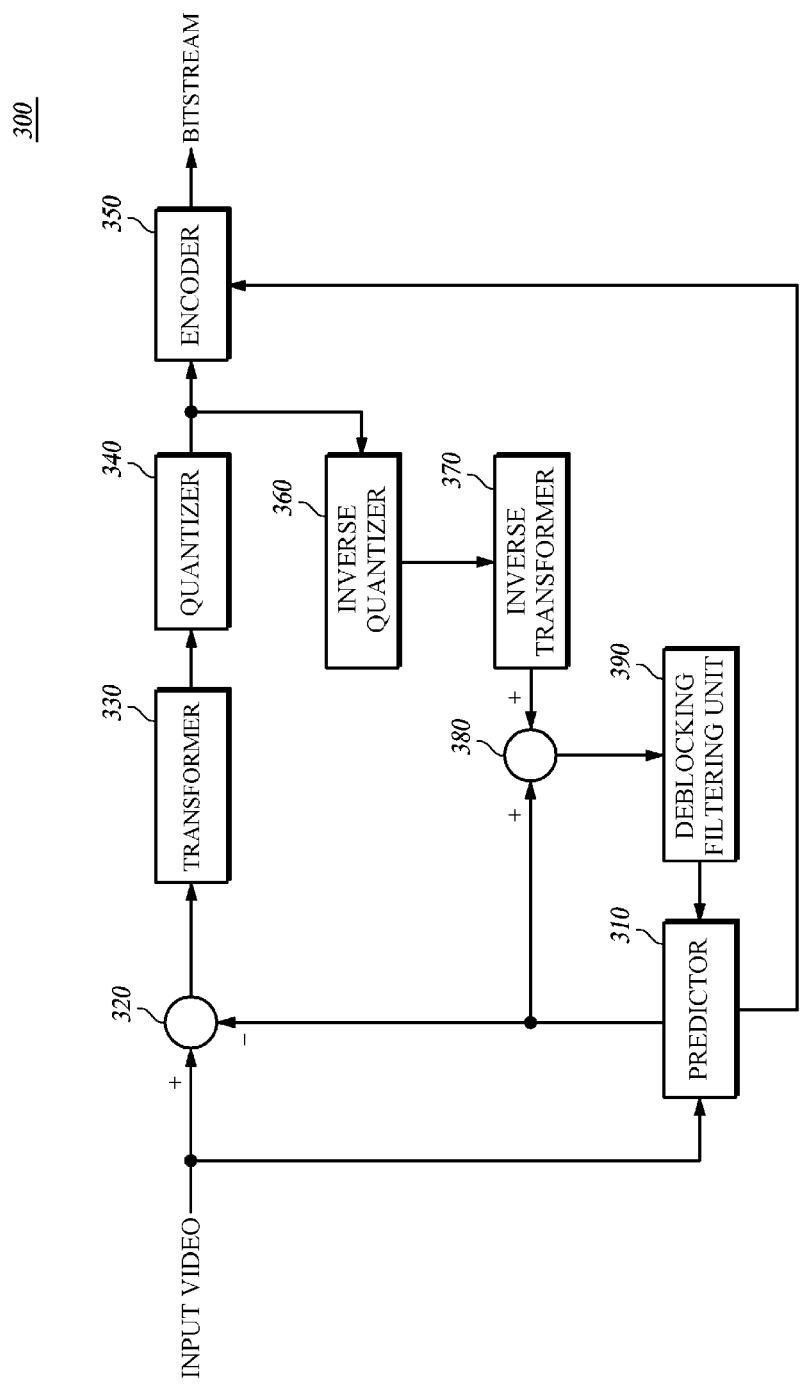
FIG. 3 is a block diagram of a video encoding apparatus according to an aspect of the present disclosure.

FIG. 3 is a block diagram for showing a video encoding apparatus 300 according to an aspect.

Referring to FIG. 3, video encoding apparatus 300 may comprise a predictor 310, a subtractor 320, a transformer 330, a quantizer 340, an encoder 350, an inverse quantizer 360, an inverse transformer 370, an adder 380, and a deblocking filtering unit 390.

Video encoding apparatus 300 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

As described above, predictor 310 may predict the current block (or macroblock) by using either one or combined both of the motion prediction-based inter prediction and the intra prediction for predicting a subsequent pixel by taking advantage of the correlations among the pixel signals within a same frame.

For example, predictor 310 may be formed by two divided sections of a motion estimator (not shown) and a motion compensator (not shown). The motion estimator searches the predicted value of a motion of the current frame macroblock from the reference frame and outputs their motion difference as a motion vector. In other words, the desired macroblock to find is searched for within a predetermined search area of the reference frame to identify the closest macroblock and its degree of motion is outputted as the motion vector. From the reference frame, the motion compensator gets a predicted macroblock corresponding to the obtained motion vector.

Alternatively, predictor 310 may be an intra predictor which predicts the current macroblock of the current frame by using macroblocks neighboring the current block, and it predicts the predicted macroblock by calculating predicted pixel values of the respective pixels in the current block using one or more pixel values of one or more adjacent macroblocks. Here, the adjacent macroblocks may be one or more macroblocks which were compressed previously of the current macroblock and are neighboring the current macroblock.

Subtractor 320 subtracts the predicted macroblock from the current block to generate a residual block. In other words, subtractor 320 calculates the difference between the original pixel value of each pixel of the current block and the predicted pixel value of each pixel of the predicted block to generate a residual lock having residual signals.

Transformer 330 transforms the residual block into frequency domain. That is, transformer 330 transforms the residual block into the frequency domain to generate a residual block with frequency coefficients. Here, transformer 330 in transforming the residual signal may use Hadamard transform, discrete cosine transform (DCT) based transform and various other transform techniques which transform image signals on the temporal axis to those on the frequency axis, wherein the transformed residual signals into the frequency domain transform are the frequency coefficients.

Quantizer 340 performs a quantization on the transformed residual block from transformer 330. That is, quantizer 340 quantizes are the frequency coefficient of the residual block to generate a quantized frequency coefficient. Here, in quantizing the frequency coefficient of the residual block, quantizer 340 may use a method such as dead zone uniform threshold quantization (DZUTQ), quantization weighted matrix, or their improved quantization methods.

Encoder 350 encodes the frequency coefficients of the residual block quantized by quantization unit 340 to generate a bitstream. In addition, upon receiving the motion vector and the rotation information delivered from predictor 310, encoder 350 may encode the same together with the frequency coefficients of the quantized residual block to output the bit stream. For this encoding operation, entropy coding technology may be used though not limited thereto and a variety of different coding techniques could be used.

Inverse quantizer 360 performs an inverse quantization on the quantized residual block from quantizer 330. In other words, inverse quantizer 360 inversely quantizes the quantized frequency coefficients of the quantized residual block to generate the frequency coefficients.

Inverse transformer 370 performs an inverse transform on the inversely quantized residual block from inverse quantizer 360. In other words, inverse transformer 370 inversely transforms the inversely quantized frequency coefficients of residual block to reconstruct the residual block having the pixel signals in the temporal axis.

Adder 380 adds the predicted block from predictor 310 to the inversely transformed residual block from inverse transformer 370 to reconstruct the current block.

Deblocking filtering unit 390 performs a deblocking filtering with respect to the current block reconstructed by adder 380. Here, deblocking filtering means a task for reducing a block distortion generated during encoding of an image by the unit of block whereby a deblocking filter may be applied to the block boundary and macroblock boundary together or macroblock boundary only and alternatively the deblocking filter may be omitted. The current block that is reconstructed by adder 380 and then deblocking-filtered by deblocking filtering unit 390 in this way may be inputted to predictor 310 and stored therein as a reference picture for use in predicting the subsequent picture.

Deblocking filtering unit 390 according to an aspect of the present disclosure in deblocking filtering a current block selects pixels to be filtered based on the intra prediction directions of the sub-blocks of the current block, performs the filtering in a horizontal, vertical or diagonal direction depending on the intra prediction directions and the relationship between the pixel values of the selected pixels. Deblocking filtering unit 390 as above will be described in more detail referring to FIG. 4.

Figure 4:
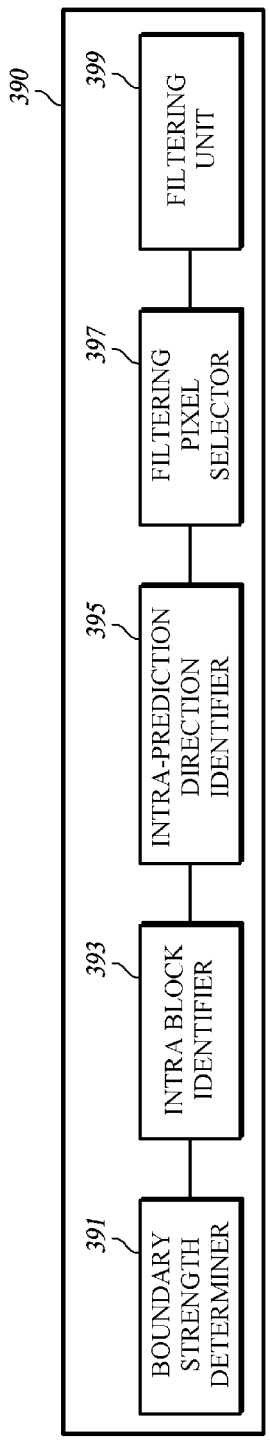
FIG. 4 is a block diagram of a deblocking filter based on intra-prediction directions according to an aspect.

FIG. 4 is a block diagram of a deblocking filter based on intra-prediction directions according to an aspect which corresponds to deblocking filtering unit 390 in FIG. 3 and is referenced by the same number 390.

As shown in FIG. 4, deblocking filter 390 based on intra-prediction directions according to an aspect includes a boundary strength determiner 391, an intra block identifier 393, an intra-prediction direction identifier 395, a filtering pixel selector 397, and a filtering unit 399.

Boundary strength determiner 391 determines boundary strength (BS) of the boundary of the current block. That is, in boundary strength determiner 391, the BS is determined according to what block characteristics particular pixels belong to in the block boundary at the current location. The BS is valued between 0 and 4 and its determination is specified in the H.264/AVC standard document.

Intra block identifier 393 checks for the intra-block identity of a sub-block enclosing a first pixel at a certain location determined with reference to the boundary of the current block. For a vertical block boundary as in FIG. 5, intra block identifier 393 checks if a subblock containing a pixel q0 on the right hand side of the block boundary is the intra block, and for a horizontal block boundary as in FIG. 6, it checks if a subblock containing a pixel q0 below the block boundary is the intra block.

Figure 7:
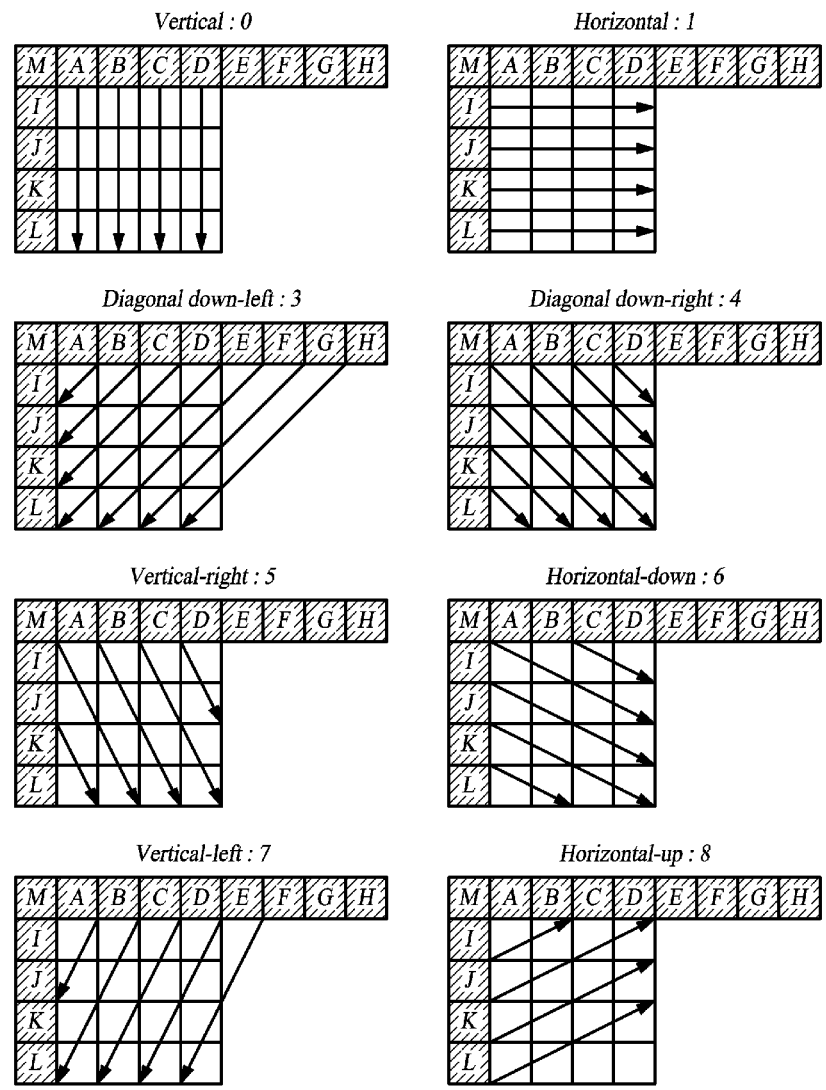
FIG. 7 is a diagram for illustrating prediction directions according to intra prediction modes.

Intra-prediction direction identifier 395 confirms an intra-prediction direction of the sub-block if the sub-block identified by intra block identifier 393 is an intra-block. FIG. 7 illustrates eight different prediction methods and directions of intra 4×4 of H.264. On top of the eight prediction methods, there may be a number 2 mode (DC) for predicting the current block with an average of adjacent pixels to bring a total of nine prediction methods/directions, which means saving the number 2 mode there remains predictions of the current block in its respective edgewise directions. Therefore, Intra-prediction direction identifier 395 identifies the corresponding sub-block as being of any one of the eight intra prediction directions in FIG. 7.

Filtering pixel selection unit 397 selects pixels to be filtered based on a pixel of q0 and the intra prediction direction identified.

Figure 8:
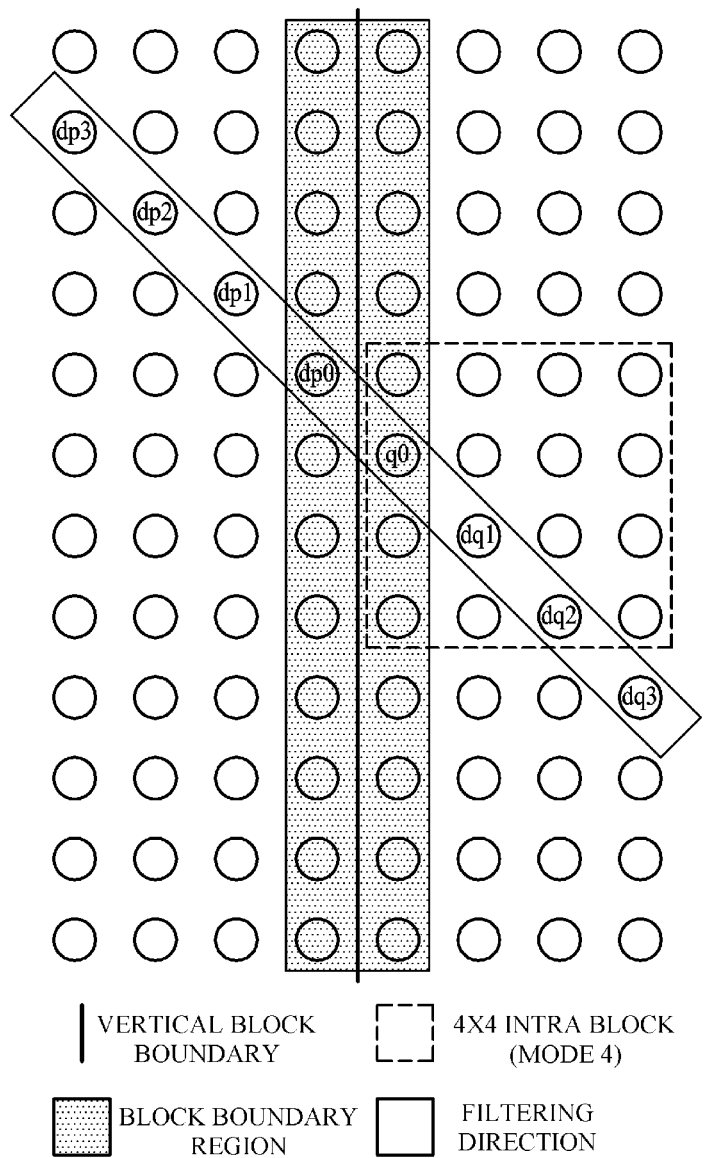
FIGS. 8 to 11 are block diagrams of a deblocking filtering method based on intra-prediction directions according to an aspect.

As shown in FIG. 8 for example, if the 4×4 subblock that encloses pixel q0 in the vertical block boundary is the intra block and the intra-prediction direction of the intra block is the intra prediction direction of mode number 4 in FIG. 7, the pixels for filtering are selected to be pixels dp3, dp2, dp1, dp0, q0, dq1, dq2, and dq3 depending on the identity of pixel q0 and the identified intra prediction direction of the number 4 mode.

Figure 9:
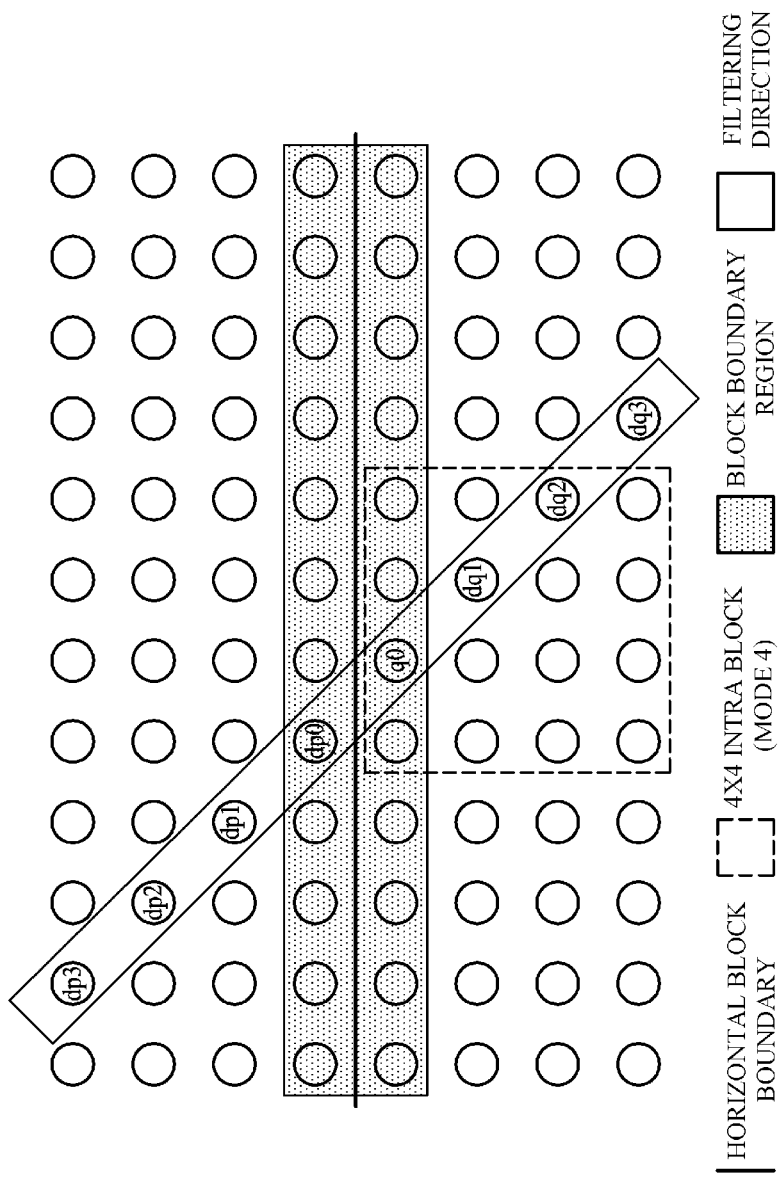

In another example shown in FIG. 9, if the 4×4 subblock containing pixel q0 in the horizontal block boundary is the intra block and the intra-prediction direction of the intra block is the intra prediction direction of mode number 4 in FIG. 7, the pixels for filtering are selected to be pixels dp3, dp2, dp1, dp0, q0, dq1, dq2, and dq3 depending on the identity of pixel q0 and the identified intra prediction direction of the number 4 mode.

Figure 10:
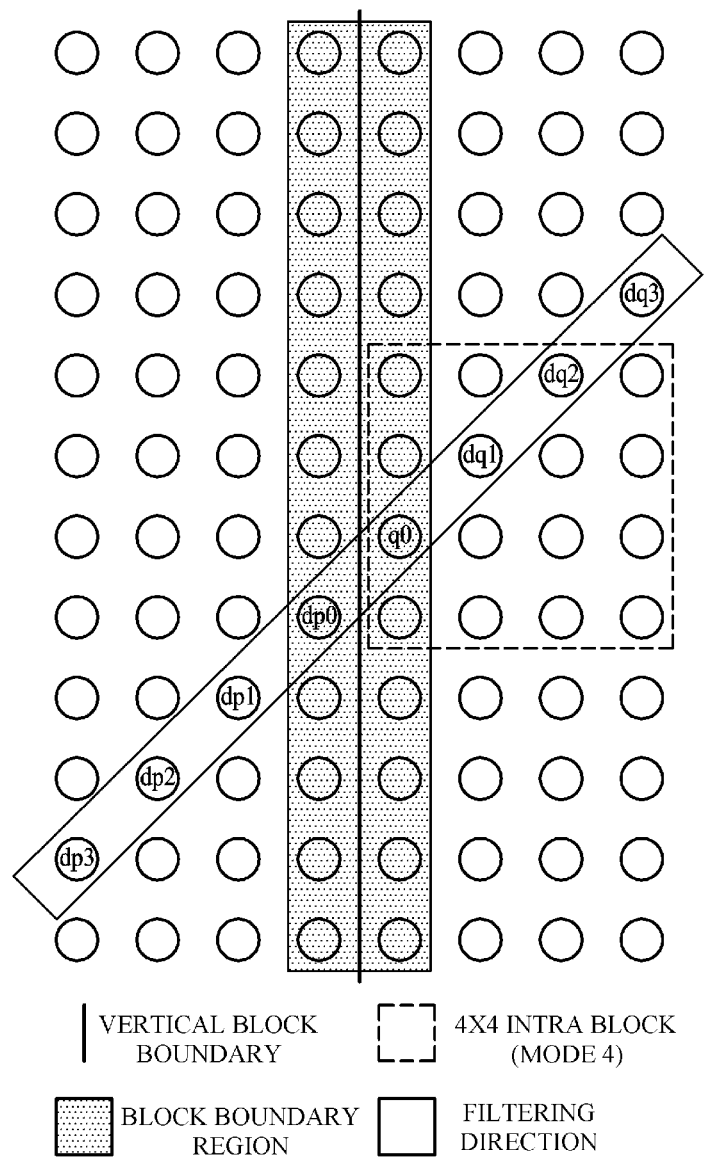

In yet another example shown in FIG. 10, if the 4×4 subblock containing pixel q0 in the vertical block boundary is the intra block and the intra-prediction direction of the intra block is the intra prediction direction of mode number 3 in FIG. 7, the pixels for filtering are selected to be pixels dp3, dp2, dp1, dp0, q0, dq1, dq2, and dq3 depending on the identity of pixel q0 and the identified intra prediction direction of the number 3 mode.

Figure 11:
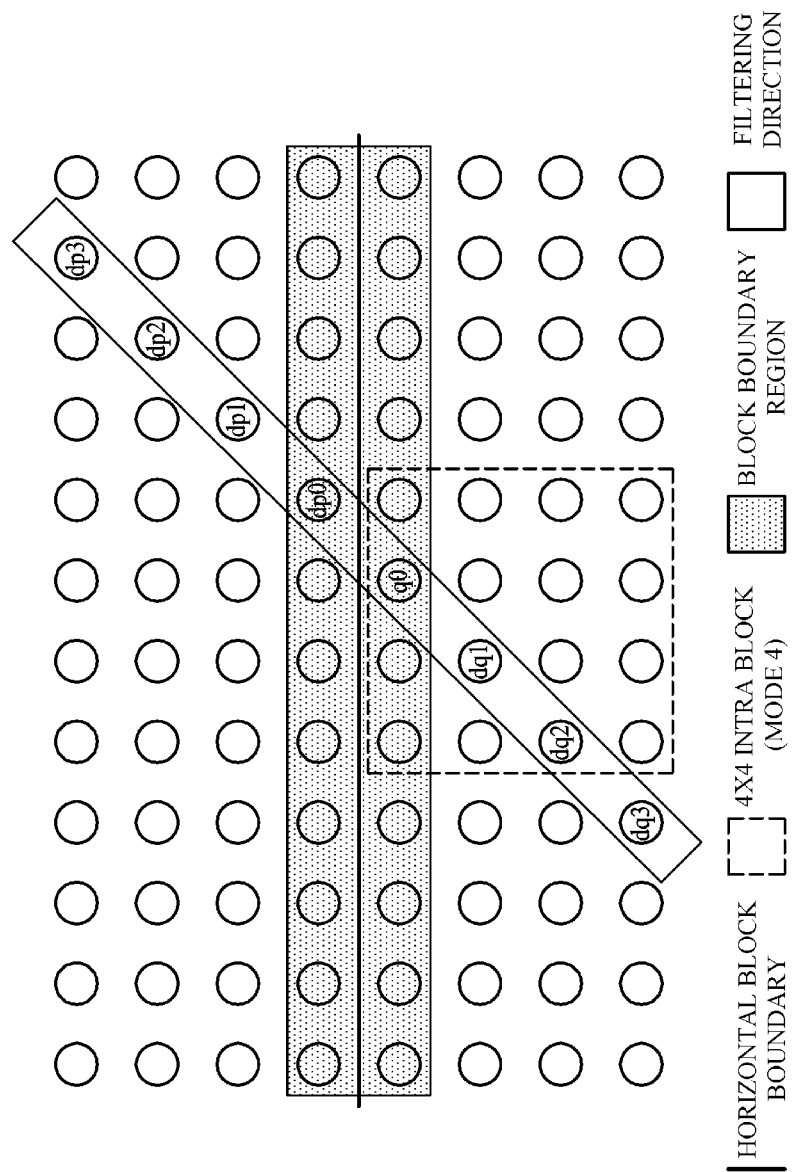

In yet another example shown in FIG. 11, if the 4×4 subblock containing pixel q0 in the horizontal block boundary is the intra block and the intra-prediction direction of the intra block is the intra prediction direction of mode number 3 in FIG. 7, the pixels for filtering are selected to be pixels dp3, dp2, dp1, dp0, q0, dq1, dq2, and dq3 depending on the identity of pixel q0 and the identified intra prediction direction of the number 3 mode.

Filtering unit 399 performs the filtering in horizontal, vertical, or diagonal direction depending on the intra prediction direction identified by intra-prediction direction identifier 395 and the relationship between the pixel values of the selected pixels from filtering pixel selection unit 397. In other words, for the identified intra prediction direction being diagonal and if the relationship between the pixel values of the selected pixels satisfies a first condition predetermined as follows, filtering unit 399 carries out the filtering in the same diagonal direction.

$$BS>0 \;\&\&\; |dp0-q0|<\alpha \;\&\&\; |dp1-dp0|<k\beta \;\&\&\; |dq1-q0|<k\beta \quad \text{[First Condition]}$$

In the first condition, $\alpha$ and $\beta$ are quantization parameter functions; q0 and dq1, with the boundary being a vertical (or horizontal) boundary, are respectively the first and second pixels on the right hand side (or lower side) of the vertical (or horizontal) boundary in the diagonal direction; dp0 and dp1, with the boundary being a vertical (or horizontal) boundary, are respectively the first and second pixels on the left hand side (or upper side) of the vertical (or horizontal) boundary in the diagonal direction; k is a constant; and q0 represents the first pixel.

In addition, filtering unit 399 performs the filtering in the typical horizontal or vertical direction if the relationship between the pixel values of the selected pixels does not satisfy the first condition.

In addition, if filtering unit 399 finds the intra prediction directions identified by intra-prediction direction identifier 395 are not diagonal which means they are vertical and horizontal as in the number 1 and 2 modes in FIG. 7, and if the relationship between the pixel values of the selected pixels from filtering pixel selection unit 397 satisfies a second condition predetermined as follows, filtering unit 399 carries out the filtering in the same horizontal or vertical direction.

$$BS>0 \;\&\&\; |p0-q0|<\alpha \;\&\&\; |p1-p0|<\beta \;\&\&\; |q1-q0|<\beta \quad \text{[Second Condition]}$$

In the second condition, $\alpha$ and $\beta$ are quantization parameter functions; q0 and q1, with the boundary being vertical (or horizontal) boundary, are respectively a first pixel and a second pixel on the right hand side (or lower side) of the vertical (or horizontal) boundary in the horizontal (or vertical) direction; p0 and p1 are respectively a first pixel and a second pixel on the left hand side (or upper side) of the vertical (or horizontal) boundary; and q0 represents the first pixel.

In addition, filtering unit 399 does not perform the filtering if the relationship between the pixel values of the selected pixels does not satisfy the second condition.

Figure 12:
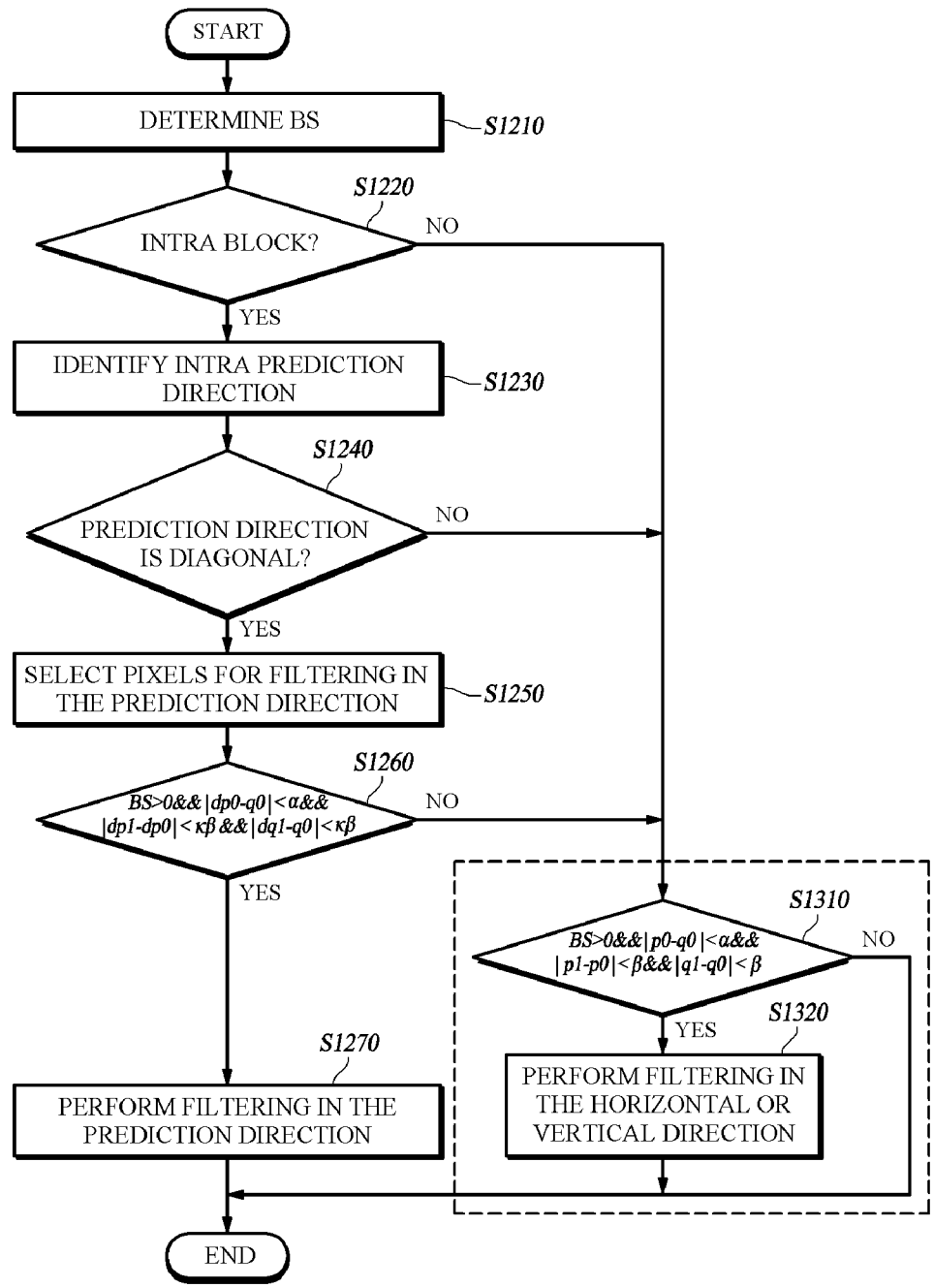
FIG. 12 is a flow diagram of a deblocking filtering method based on intra-prediction directions according to an aspect.

FIG. 12 is a flow diagram of a deblocking filtering method based on intra-prediction directions according to an aspect which is applicable to deblocking filter 390 in FIG. 4 and will be described together with its operation.

This aspect of the disclosure may use the directions of the H.264 intra prediction technique. H.264 has introduced the intra prediction technique in order to remove the spatial correlation between blocks. The intra prediction technique uses neighboring pixels of the block to be currently encoded to predict the pixel values of current block. FIG. 7 illustrates the eight prediction ways of the intra 4×4 mode of H.264. To the eight predictions, number 2 mode (DC) for predicting the current block with an average of adjacent pixels may be added to bring a total of nine prediction methods/directions, which means saving the number 2 mode there remains predictions of the current block in its respective edgewise directions. Among these predictions, one in the direction that is most similar to the edge of the current block is selected as the optimal prediction mode to perform the prediction in that way, and then the difference of the current block from the predicted value is transformed, quantized, and entropy-encoded.

Rather than seeking after the edge direction for every block boundary, this aspect of the present disclosure takes advantage of the edge direction used in the intra prediction and performs the deblocking filtering in that edge direction. Therefore, the aspect of the present disclosure may be applied in the case of the current macroblock being an intra mode. In addition, in the DC mode, vertical mode, and horizontal mode, the filtering is performed as in the conventional method of filtering simply vertically or horizontally.

Basically, the deblocking filtering is performed in units of a macroblock through the following two steps. The first step is to perform the deblocking filtering at the vertical block boundary as shown FIG. 1, and second step is to first assume the deblocking filtering at the vertical block boundary and then advances the deblocking filtering to the vertical block boundary. In the present disclosure also, the operation is through the above two steps.

FIG. 12 illustrates a procedure of a deblocking filtering with respect to a pixel according to an aspect. The whole process of FIG. 12 is first applied to all of the vertically extending boundary blocks of a macroblock and then to all of the horizontally extending boundary blocks. The procedure of FIG. 12 will be detailed next.

First, depending on the characteristics of blocks containing pixels at the boundary of a block at the current location, a boundary strength BS is determined through boundary strength determiner 391 in step S1210. BS has a value between 0 and 4 and an exemplary method of the determination is stated in the H.264/AVC standard document.

Next, through intra block identifier 393 it is checked whether the block containing a pixel on the right hand side or lower side of the block boundary is the intra block (the right hand side pixel if the block boundary extends vertically and the lower side pixel if the block boundary extends horizontally) in step S1220.

If step S1220 finds that the identified block is not the intra block, filtering unit 399 performs the filtering on the current block in the conventional deblocking filtering method in steps S1310 and S1320.

If step S1220 finds that the identified block is the intra block, intra-prediction direction identifier 395 identifies the intra prediction direction of the intra block in step S1230. Determination of the prediction direction with the intra mode of the block containing the right hand side pixel or the lower side pixel with respect to the block boundary is grounded on the prediction of the current block with the left side pixel and upper side pixel of the current block.

If step S1230 concludes that the intra prediction direction is not diagonal (S1240) but is, for example number 0 mode (vertical direction), number 1 mode (horizontal direction), or number 2 mode (average) in the intra 4×4 mode of FIG. 7, filtering unit 399 performs the filtering by using the conventional deblocking filtering method in steps S1310 and S1320.

If step S1230 finds that the intra prediction direction is diagonal (S1240), filtering pixel selector 397 selects pixels to filter in that diagonal intra prediction direction in step S1250. For example, if the intra 4×4 mode of the current block is the number 4 mode of FIG. 4, filtering pixel selector 397 selects the filtering pixels of dp3, dp2, dp1, dp0, q0, dq1, dq2, and dq3 as shown in FIG. 8. These pixels are selected with intra prediction directions using q0 as a basis. After selecting the eight pixels, it is checked whether the described Condition 1 is satisfied in step S1260, and if not, the procedure takes conventional filtering method in steps S1310 and 1320.

If Condition 1 is satisfied, filtering unit 399 performs the deblocking filtering by using pixels dp3, dp2, dp1, dp0, q0, dq1, dq2, and dq3. Filtering methods by filtering coefficients or thresholds may be same as those which are disclosed by the existing H.264/AVC standard document.

The conventional filtering methods carried out in steps S1310 and S1320 are as follows: If the described Condition 2 is satisfied, filtering unit 399 performs the filtering in steps S1310 and S1320 or it determines that the current pixel to be the actual edge refraining from doing the filtering.

Figure 5:
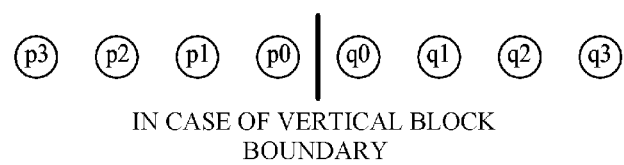
FIG. 5 is an exemplary diagram for illustrating pixels for a horizontal filtering in the case of a vertical block boundary.
Figure 6:
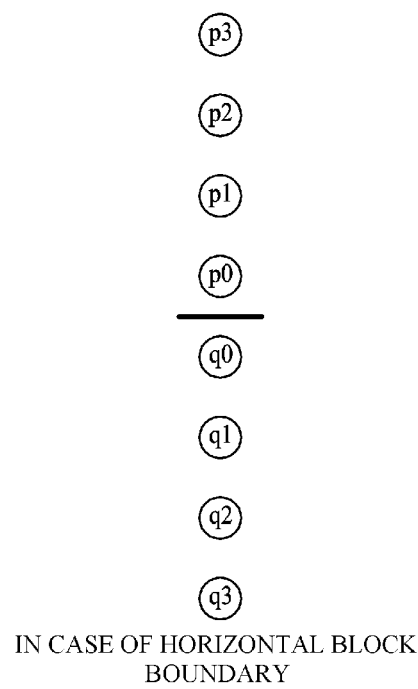
FIG. 6 is an exemplary diagram for illustrating pixels for a vertical filtering in the case of a horizontal block boundary.

The conventional filtering method carried out in steps S1310 and S1320 is in vertical and horizontal directions only wherein the filtering pixels are indicated by p3, p2, p1, p0, q0, q1, q2, and q3 as in FIGS. 5 and 6.

The deblocking filtering method of this aspect is performed in this way, and FIGS. 8 through 11 illustrate the exemplary filtering pixels selected in the intra prediction direction.

In the example of FIG. 8, there is the vertical block boundary on the right side of which are pixels in the intra 4×4 mode that is indicated by number 4 mode. When the filtering direction is known to coincide with the intra prediction direction as in the case of FIG. 8 and q0 is determined, dp3, dp2, dp1, dp0, dq1, dq2, and dq3 are arranged in sequence and filtered in the same direction as the intra prediction direction.

In the example of FIG. 9, there is the horizontal block boundary on the lower side of which are pixels in the intra 4×4 mode that is indicated by number 4 mode.

In the example of FIG. 10, there is the vertical block boundary on the right side of which are pixels in the intra 4×4 mode that is indicated by number 3 mode.

In the example of FIG. 11, there is the horizontal block boundary on the lower side of which are pixels in the intra 4×4 mode that is indicated by number 3 mode.

Figure 13:
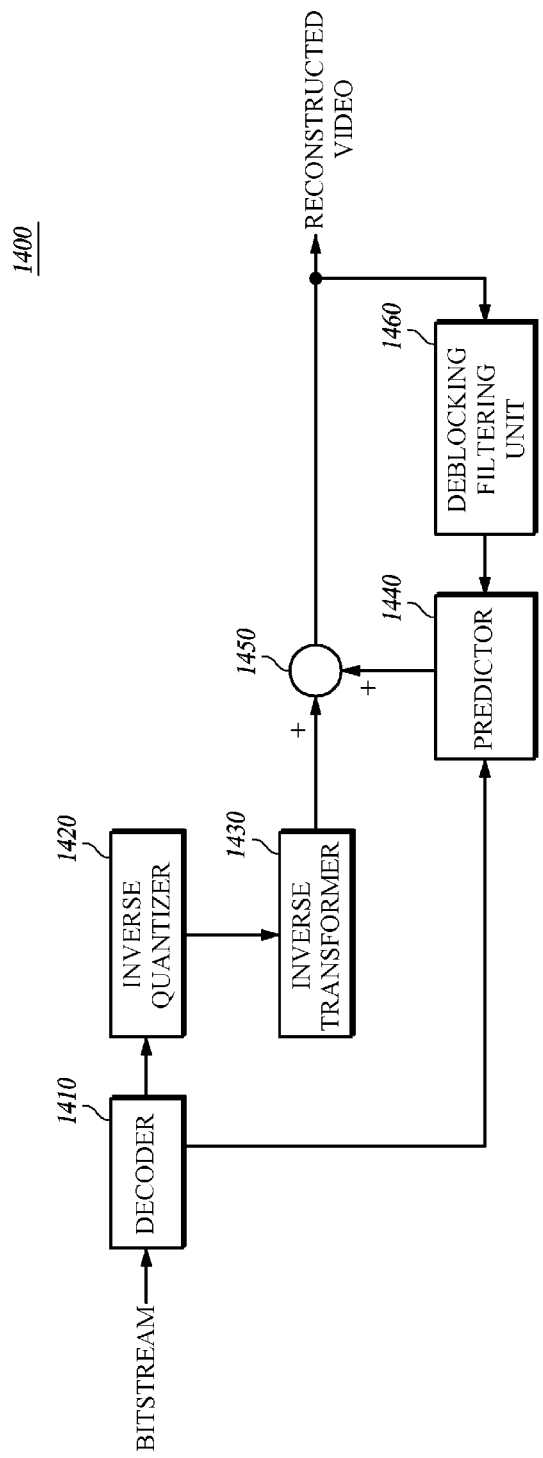
FIG. 13 is a block diagram of a video decoding apparatus according to an aspect of the present disclosure.

FIG. 13 is a block diagram of a video decoding apparatus 1400 according to an aspect of the present disclosure.

Video decoding apparatus 1400 may include a decoder 1410, an inverse quantizer 1420, an inverse transformer 1430, a predictor 1440, an adder 1450, and a deblocking filtering unit 1460.

Video decoding apparatus 1400 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for decoding videos and related data, and a microprocessor for executing the programs to effect operations and controls.

Decoder 1410 decodes a bitstream to extract a residual block. Specifically, decoder 2010 decodes the bitstream which is the video encoded by video encoding apparatus 200 and extracts the residual block which contains pixel information of the video current block along with a motion vector and rotation information.

Figure 2:
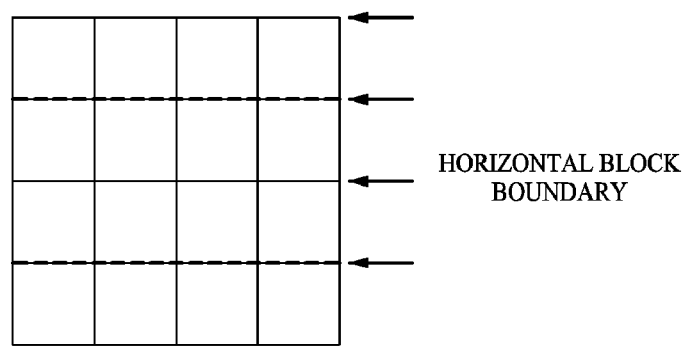

Inverse quantizer 1420 inversely quantizes the residual block from decoder 1410. Inverse transformer 1430 inversely transforms the inversely quantized residual signal. Here, the inverse quantization and the inverse transform may be performed in the same way as those described through FIG. 2.

Predictor 1440 for generating a predicted block performs a prediction on the current block by compensating motions including the rotational motion of the current block of an image with the motion vector and rotation information extracted by decoder 1410.

Adder 1450 adds the predicted block from predictor 1440 to the inversely transformed residual signal from inverse transformer 1430 to reconstruct the current block.

Deblocking filtering unit 1460 performs a deblocking filtering with respect to the current block for reducing the block distortions with the reduction of possible errors occurring in the course of the quantization. Deblocking filtering unit 1460 in this aspect particularly selects the filtering pixels based on the intra prediction directions of the subblocks of the current block, and performs the filtering horizontally, vertically, or diagonally depending on the intra prediction direction and the relationships between the pixel values of the selected pixels. Such deblocking filtering unit 1460 is equally constructed to deblocking filtering unit 390 of FIG. 4 for example.

The current blocks reconstructed by adder 1450 are combined by the unit of picture and outputted as a reconstructed image, and the current blocks having been deblocking-filtered by deblocking filter 1460 may be stored as a reference picture to be used predictor 1440 for predicting the subsequent picture.

The above disclosed aspects of the deblocking filtering method based on intra-prediction directions may be implemented by a computer readable code on a computer readable recording medium. The computer readable media may comprise any kinds of recording devices for recording data readable by computer systems. Examples of such computer readable recording media include ROM, RAM, CD-ROM, magnetic tapes, floppy discs, and optical data storages, and further comprise an implementation in carrier waves (e.g. transmission over the Internet). In addition, the computer readable recording media may be provided in a distributed processing system where computer systems are networked to store and execute computer readable codes at distributed locations.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

[Industrial Applicability]

As described above, the present disclosure is highly useful for application to video encoding/decoding techniques for removing not only the blocking artifacts at edges extending in vertical and horizontal directions but also the blocking artifacts possibly occurring within a diagonal edge at the boundary between blocks through a deblocking filtering in the intra-prediction directions.

The invention claimed is:

1. A deblocking filter based on intra-prediction directions, the deblocking filter comprising:
   an intra-block identifier configured to identify whether a current block is an intra block,
   an intra-prediction direction identifier configured to perform an identification of an intra-prediction direction of the current block when the current block is the intra block;
   a filtering pixel selection unit configured to select a set of pixels for deblocking-filtering between the current block and a neighboring block based on the intra-prediction direction of the current block; and
   a filtering unit configured to perform the deblocking-filtering of the selected set of pixels based on a direction determined by the intra-prediction direction of the current block in order to remove blocking artifact between the current block and the neighboring block,
   wherein the selected set of pixels positioned in the intra-prediction direction, for each pixel in the boundary of the current block and the neighboring block, are updated by performing the deblocking-filtering,
   wherein, when the determined direction is a diagonal direction,
      the filtering unit is configured to select a deblocking direction among the diagonal direction, a horizontal direction and a vertical direction to perform the deblocking-filtering of the selected set of pixels, based on a relationship between values of the selected set of pixels, and
      the deblocking direction is set to be the diagonal direction when the relationship satisfies a first condition, and the deblocking direction is set to be the horizontal direction or the vertical direction when the relationship does not satisfy the first condition, and
   wherein the first condition is satisfied when each of pixel value differences between two adjacent pixels in the selected set of pixels is less than each preset value corresponding to said each of the pixel value differences, and
   the selected set of pixels are positioned in the diagonal direction.

2. The deblocking filter of claim 1,
wherein at least one of preset values corresponding to the pixel value differences is determined based on quantization parameter functions for quantization frequency coefficients.

3. The deblocking filter of claim 2, further comprising:
a boundary strength determiner configured to determine a strength of a boundary of the current block,
wherein the first condition is BS>0 && |dp0−q0|<α && |dp1−dp0|<β && |dq1−q0|<k β where BS is a boundary strength, && is a logical operator, AND, and α and β are quantization parameter functions for quantization frequency coefficients; q0 and dq1, with the boundary being a vertical (or horizontal) boundary, are respectively a first pixel and a second pixel on the right hand side (or lower side) of the vertical (or horizontal) boundary in the diagonal direction; dp0 and dp1, with the boundary being the vertical (or horizontal) boundary, are respectively a first and second pixels on the left hand side (or upper side) of the vertical (or horizontal) boundary in the diagonal direction; k is a constant; and q0 represents the first pixel of the current block.

4. The deblocking filter of claim 1, wherein the filtering unit, in the case where the intra-prediction direction is identified as being nondiagonal, is further configured to carry out the deblocking-filtering in the horizontal direction or the vertical direction when the relationship between values of the selected set of pixels for the deblocking-filtering satisfies a second condition.

5. The deblocking filter of claim 4, further comprising:
a boundary strength determiner configured to determine a strength of a boundary of the current block,
wherein the second condition is BS>0 && |p0−q0|<α && |p1−p0|<β && |q1−q0|<β where BS is a boundary strength, && is a logical operator, AND, and α and β are quantization parameter functions for quantization frequency coefficients; q0 and q1, with the boundary being a vertical (or horizontal) boundary, are respectively a first pixel and a second pixel on the right hand side (or lower side) of the vertical (or horizontal) boundary in the horizontal (or vertical) direction; p0 and p1 are respectively a first pixel and a second pixel on the left hand side (or upper side) of the vertical (or horizontal) boundary; and q0 represents the first pixel of the current block.

6. The deblocking filter of claim 4, wherein the filtering unit is configured not to perform the deblocking-filtering when the second condition is not satisfied.

7. A deblocking filtering method based on intra-prediction directions, the deblocking filtering method comprising:
identifying whether a current block is an intra block;
performing an identification of an intra-prediction direction of the current block when the current block is the intra block;
selecting a set of pixels for deblocking-filtering between the current block and a neighboring block of the current block based on the intra-prediction direction; and
performing the deblocking-filtering of the selected set of pixels based on a direction determined by the intra-prediction direction of the current block in order to remove blocking artifact between the current block and the neighboring block,
wherein the selected set of pixels positioned in the intra-prediction direction, for each pixel in the boundary of the current block and the neighboring block, are updated by performing the deblocking-filtering,
wherein, when the determined direction is a diagonal direction,
a deblocking direction to perform the deblocking-filtering of the selected set of pixels is selected among the diagonal direction, a horizontal direction and a vertical direction, based on a relationship between values of the selected set of pixels, and
the deblocking direction is set to be the diagonal direction when the relationship satisfies a first condition, and the deblocking direction is set to be the horizontal direction or the vertical direction when the relationship does not satisfy the first condition, and
wherein the first condition is satisfied when each of pixel value differences between two adjacent pixels in the selected set of pixels is less than each preset value corresponding to said each of the pixel value differences, and
the selected set of pixels are positioned in the diagonal direction.

8. The deblocking filtering method of claim 7,
wherein at least one of preset values corresponding to the pixel value differences is determined based on quantization parameter functions for quantization frequency coefficients.

9. The deblocking filtering method of claim 8, further comprising:
determining a strength of a boundary of the current block,
wherein the first condition is BS>0 && |dp0−q0|<α && |dp1−dp0|<kβ && |dq1−q0|<k β where BS is a boundary strength, && is a logical operator, AND, and α and β are quantization parameter functions for quantization frequency coefficients; q0 and dq1, with the boundary being the vertical (or horizontal) boundary, are respectively a first pixel and a second pixel on the right hand side (or lower side) of the vertical (or horizontal) boundary in the diagonal direction; dp0 and dp1, with the boundary being a vertical (or horizontal) boundary, are respectively a first and second pixels on the left hand side (or upper side) of the vertical (or horizontal) boundary in the diagonal direction; k is a constant; and q0 represents the first pixel of the current block.

10. The deblocking filtering method of claim 7, wherein, in the case where the intra-prediction direction is identified as being nondiagonal and when the relationship between values of the selected set of pixels for deblocking-filtering satisfies a second condition,
the deblocking-filtering is carried out in the horizontal direction or the vertical direction.

11. The deblocking filtering method of claim 10, further comprising:
determining a strength of a boundary of the current block,
wherein the second condition is BS>0 && |p0−q0|<α && |p1−p0|<β && |q1−q0|<β where BS is a boundary strength, && is a logical operator, AND, and α and β are quantization parameter functions for quantization frequency coefficients; q0 and q1, with the boundary being a vertical (or horizontal) boundary, are respectively a first pixel and a second pixel on the right hand side (or lower side) of the vertical (or horizontal) boundary in the horizontal (or vertical) direction; p0 and p1 are respectively a first pixel and a second pixel on the left hand side (or upper side) of the vertical (or horizontal) boundary; and q0 represents the first pixel of the current block.

12. The deblocking filtering method of claim 10, wherein the deblocking-filtering is not carried out when the second condition is not satisfied.

13. A video encoding apparatus, comprising:
a predictor configured to perform an intra prediction of a current block to generate a predicted block;

a subtractor configured to subtract the predicted block from the current block to generate a residual block;
a transformer configured to transform on the residual block into a frequency domain;
a quantizer configured to quantize on the transformed residual block to generate a quantized block;
an encoder configured to encode the quantized block;
an inverse quantizer configured to perform an inverse quantization on the quantized block to generate an inversely quantized block;
an inverse transformer configured to perform an inverse transform on the inversely quantized block to generate an inversely transformed block;
an adder configured to add the predicted block to the inversely transformed block to reconstruct the current block; and
a deblocking filtering unit configured to perform a deblocking-filtering of the current block by
selecting a set of pixels for deblocking-filtering between the current block and a neighboring block of the current block based on an intra-prediction direction of the current block, and
performing the deblocking-filtering of the selected set of pixels based on a direction determined by the intra-prediction direction of the current block in order to remove blocking artifact between the current block and the neighboring block,
wherein the selected set of pixels positioned in the intra-prediction direction, for each pixel in the boundary of the current block and the neighboring block, are updated by performing the deblocking-filtering,
wherein, when the determined direction is a diagonal direction,
the deblocking filtering unit is configured to select a deblocking direction among the diagonal direction, a horizontal direction and a vertical direction to perform the deblocking-filtering of the selected set of pixels, based on a relationship between values of the selected set of pixels, and
the deblocking direction is set to be the diagonal direction when the relationship satisfies a first condition, and the deblocking direction is set to be the horizontal direction or the vertical direction when the relationship does not satisfy the first condition, and
wherein the first condition is satisfied when each of pixel value differences between two adjacent pixels in the selected set of pixels is less than each preset value corresponding to said each of the pixel value differences, and
the selected set of pixels are positioned in the diagonal direction.

14. The video encoding apparatus of claim 13, wherein at least one of preset values corresponding to the pixel value differences is determined based on quantization parameter functions for quantization frequency coefficients.

15. The video encoding apparatus of claim 14, wherein the deblocking filtering unit is further configured to determine a strength of a boundary of the current block,
wherein the first condition is BS>0 && |dp0−q0|<α && |dp1−dp0|<k β && |dq1−q0|<k β where BS is a boundary strength, && is a logical operator, AND, and α and β are quantization parameter functions for quantization frequency coefficients; q0 and dq1, with the boundary being a vertical (or horizontal) boundary, are respectively a first pixel and a second pixel on the right hand side (or lower side) of the vertical (or horizontal) boundary in the diagonal direction; dp0 and dp1, with the boundary being the vertical (or horizontal) boundary, are respectively a first pixel and a second pixel on the left hand side (or upper side) of the vertical (or horizontal) boundary in the diagonal direction; and k is a constant.

16. The video encoding apparatus of claim 13, wherein the deblocking filtering unit, in the case where the intra-prediction direction is nondiagonal, is further configured
to carry out the deblocking-filtering in the horizontal direction or the vertical direction when the relationship between values of the selected set of pixels satisfies a second condition, and
not to carry out the deblocking-filtering when the relationship does not satisfy the second condition.

17. The video encoding apparatus of claim 16, wherein the deblocking filtering unit is further configured to determine a strength of a boundary of the current block,
wherein the second condition is BS>0 && |p0−q0|<α && |p1−p0|<β && q1−q0|<β where BS is a boundary strength, && is a logical operator, AND, and α and β are quantization parameter functions for quantization frequency coefficients; q0 and q1, with the boundary being a vertical (or horizontal) boundary, are respectively a first pixel and a second pixel on the right hand side (or lower side) of the vertical (or horizontal) boundary in the horizontal (or vertical) direction; and p0 and p1 are respectively a first pixel and a second pixel on the left hand side (or upper side) of the vertical (or horizontal) boundary.

18. A video decoding apparatus, comprising:
a decoder configured to decode a bitstream to extract a residual block;
an inverse quantizer configured to perform an inverse quantization on the residual block to generate an inversely quantized block;
an inverse transformer configured to perform an inverse transform on the inversely quantized block to generate an inversely transformed block;
a predictor configured to predict a current block to generate a predicted block;
an adder configured to add the predicted block to the inversely transformed block to reconstruct the current block; and
a deblocking filtering unit configured to perform a deblocking-filtering of the current block by
selecting a set of pixels for the deblocking-filtering between the current block and a neighboring block of the current block based on an intra-prediction direction of the current block, and
performing the deblocking-filtering of the selected set of pixels based on a direction determined by the intra-prediction direction of the current block in order to remove blocking artifact between the current block and the neighboring block,
wherein the selected set of pixels positioned in the intra-prediction direction, for each pixel in the boundary of the current block, are updated by performing the deblocking-filtering,
wherein, when the determined direction is a diagonal direction,
the deblocking filtering unit is configured to select a deblocking direction among the diagonal direction, a horizontal direction and a vertical direction to perform the deblocking-filtering of the selected set of pixels, based on a relationship between values of the selected set of pixels, and the deblocking direction is set to be the diagonal direction when the relationship satisfies a first condition, and the deblocking direction is set to be the horizontal direction or the vertical direction when the relationship does not satisfy the first condition, and wherein the first condition is satisfied when each of pixel value differences between two adjacent pixels in the selected set of pixels is less than each preset value corresponding to said each of the pixel value differences, and the selected set of pixels are positioned in the diagonal direction.

19. The video decoding apparatus of claim 18, wherein at least one of preset values corresponding to the pixel value differences is determined based on quantization parameter functions for quantization frequency coefficients.

20. The video decoding apparatus of claim 19, wherein the deblocking filtering unit, is further configured to determine a strength of a boundary of the current block, wherein the first condition is BS>0 && |dp0−q0|<α && |dp1−dp0|<k β && |dq1−q0|<k β where BS is a boundary strength, && is a logical operator, AND, and α and β are quantization parameter functions for quantization frequency coefficients; q0 and dq1, with the boundary being a vertical (or horizontal) boundary, are respectively a first pixel and a second pixel on the right hand side (or lower side) of the vertical (or horizontal) boundary in the diagonal direction; dp0 and dp1, with the boundary being a vertical (or horizontal) boundary, are respectively a first pixel and a second pixel on the left hand side (or upper side) of the vertical (or horizontal) boundary in the diagonal direction; and k is a constant.

21. The video decoding apparatus of claim 18, wherein the deblocking filtering unit, in the case where the intra-prediction direction is nondiagonal, is configured to carry out the deblocking-filtering in the horizontal direction or the vertical direction when the relationship between values of the selected set of pixels satisfies a second condition, and not to carry out the deblocking-filtering of the selected pixels unless the relationship between the first pixel and the second pixel among the selected pixels satisfies the second condition.

22. The video decoding apparatus of claim 21, wherein the deblocking filtering unit, is further configured to determine a strength of a boundary of the current block, wherein the second condition having been predetermined is BS>0 &&|p0−q0|<α && |p1−p0|<β && |q1−q0|<β where BS is a boundary strength, && is a logical operator, AND, and α and β are quantization parameter functions for quantization frequency coefficients; q0 and q1, with the boundary being a vertical (or horizontal) boundary, are respectively a first pixel and a second pixel on the right hand side (or lower side) of the vertical (or horizontal) boundary in the horizontal (or vertical) direction; and p0 and p1 are respectively a first pixel and a second pixel on the left hand side (or upper side) of the vertical (or horizontal) boundary.

23. A non-transitory computer readable medium storing a computer program comprising functions of:

identifying whether a current block is an intra block;

performing an identification of an intra-prediction direction of the current block when the subblock is the intra block;

selecting a set of pixels for deblocking-filtering between the current block and a neighboring block of the current block based on the intra-prediction direction of the current block; and performing the deblocking-filtering of the selected set of pixels based on a direction determined by the intra-prediction direction of the current block in order to remove blocking artifact between the current block and the neighboring block, wherein the selected set of pixels positioned in the intra-prediction direction, for each pixel in the boundary of the current block and the neighboring block, are updated by performing the deblocking-filtering, wherein, when the determined direction is a diagonal direction, the performing of the deblocking-filtering comprises selecting a deblocking direction among the diagonal direction, a horizontal direction and a vertical direction to perform the deblocking-filtering of the selected set of pixels, based on a relationship between values of the selected set of pixels, and the deblocking direction is set to be the diagonal direction when the relationship satisfies a first condition, and the deblocking direction is set to be the horizontal direction or the vertical direction when the relationship does not satisfy the first condition, and wherein the first condition is satisfied when each of pixel value differences between two adjacent pixels in the selected set of pixels is less than each preset value corresponding to said each of the pixel value differences, and the selected set of pixels are positioned in the diagonal direction.

* * * * *